United States Patent Office 3,785,989
Patented Jan. 15, 1974

3,785,989
NOVEL DAYLIGHT FLUORESCENT PIGMENTS AND PROCESS FOR PREPARING THEM
Siegfried Noetzel, Mainz, and Edgar Fischer, Frankfurt am Main, Germany, assignors to Farbwerke Hoechst Aktiengesellschaft vormals Meister Lucius & Bruning, Frankfurt am Main, Germany
No Drawing. Filed Jan. 31, 1972, Ser. No. 222,309
Claims priority, application Germany, Feb. 2, 1971, P 21 04 718.7
Int. Cl. C09k 1/02
U.S. Cl. 252—301.2 R                  3 Claims

ABSTRACT OF THE DISCLOSURE

New daylight fluorescent pigments which contain an organic fluorescent dyestuff and as resin a condensation resin, consisting of copolymerizates of unsaturated carboxylic acid anhydrides and other vinyl compounds which are cross-linked with bi-or polyfunctional alcohols and a process for their preparation which comprises incorporating the organic fluorescent dyestuff into the condensation resin. These daylight fluorescent pigments may be employed for preparing fluorescent paints, for example air-drying lacquers on the basis of alkyl resin or physically drying lacquers on the basis of acrylic resins, as well as for preparing fluorescent printing inks such as inks for screen printing, intaglio printing, book-printing and offset-litho printing. Due to their resistance to heat, they are particularly suitable for fluorescent dyeing of plastic and enamels.

---

The present invention relates to novel daylight fluorescent pigments which contain an organic fluorescent dyestuff and as a base resin a polyester resin consisting of copolymers of unsaturated carboxylic acid anhydrides and other vinyl compounds that are cross-linked with bi-or polyfunctional alcohols.

This invention also relates to a process for preparing these pigments which comprises incorporating the organic fluorescent dyestuff in the condensation resin.

For preparing the copolymers containing anhydride groups, the following monomers may be used as starting compounds: Maleic acid anhydride, tetrahydrophthalic acid anhdyride or endocis-bicyclo-(2,2,1)-5-heptene-2,3-dicarboxylic acid anhydride as well as (meth)acrylic acid alkyl and aryl esters, styrene, α-methyl-styrene, acrylonitrile, vinyl chloride, vinyl ethers, such as methylvinyl ether, ethyl-vinyl ether, and vinyl esters, such as vinyl acetate, vinyl propionate and vinyl butyrate.

It is possible to copolymerize two or more of the monomers cited, of which at least one unsaturated carboxylic acid anhydride has to be present.

Copolymerization of these monomers is carried out according to known methods, for example by solution polymerization in solvents such as ketones, esters, aromatic hydrocarbons having radical initiators, such as dibenzoyl peroxide, dicumyl peroxide, ditert.-butyl peroxide or azoisobutyronitrile, where required in the presence of chain-transferring agents, such as aliphatic mercaptanes. It has proved advantageous to perform polymerization in such a manner that the monomer mixture is fed jointly with the peroxide initiator and the chain-transferring agent over the total polymerization period. In this manner, products are obtained, that have a molecular weight of from about 3000 to 50,000 and which are particularly suitable for a cross-linking with alcohols. The amount of monomer containing anhydride groups and being incorporated in the polymer is determined by the amount and functionality of the cross-linking agent; it is preferably from 10 to 50% by weight of the total weight of copolymer.

The products thus obtained are cross-linked with bi- and polyfunctional alcohols or mixtures thereof, such as ethylene glycol, neopentyl glycol, trimethylol-ethane or pentaerythritol. According to this reaction, the copolymers containing anhydride groups, are mixed in solvents, such as monoalkyl-glycol esters, dimethylformamide, dimethylsulfoxide or dioxan, with the bi- and/or polyfunctional alcohols at room temperature or at an elevated temperature, and the mixtures are cross-linked at 120°–200° C. under normal or reduced pressure for several hours, while the solvent is eliminated. It is advantageous to add the di- or polyalcohol while carefully stirring at temperatures of from 50° to 120° C., to an alkyl-glycol acetate solution containing 40 to 60% by weight of the copolymer. The amount of the alcohol added depends on its functionality; the alcohol should be used in such a ratio that there are two hydroxyl groups per anhydride group. The alcohol may, of course, also be used in an amount of up to half an equivalent in excess or in deficiency with regard to the anhydride group, whereupon cross-linked products having different hardnesses are obtained.

Both in the preparation of the copolymers containing anhydride groups and in the subsequent cross-linking reaction, the type and amount of the starting compounds used may vary within wide limits. Those skilled in the art are, however, very well able to choose such starting components in such mixing ratios that the polyester resins obtained have the properties required for the production of daylight fluorescent pigments.

The polyester resins thus obtained are distinguished by a good transparency, brightness and brittleness as well as by a satisfactory resistance toward organic solvents, oxygen and moisture. Moreover, they have a better thermostability and fastness to light than the resins known from U.S. Pat. Nos. 2,498,592, 2,809,954, 2,938,873, 3,116,256 and 3,412,036, from British Pat. Nos. 734,181, 748,484, 792,616 and 1,048,983 and from German Pat. No. 961,575. These properties render the resins of the invention especially suitable for the application in daylight fluorescent pigments. Daylight fluorescent pigments consist of a colorless finely ground base resin in which a fluorescent dyestuff has been incorporated. Such daylight fluorescent pigments are being used more and more in the lacquer, printing ink and plastics industry and in the field of textile materials and for the coating of paper.

As fluorescent dyestuffs there are considered organic compounds which are fluorescent by daylight in dissolved or solid, crystalline form, for example fluorescent dyestuffs of the rhodamine, sulfo-rhodamine or naphthalimide series. The dyestuffs disclosed in French Pats. Nos. 1,590,-506, 1,444,489, 1,488,113 and 1,470,793 may also be used.

For the production of the daylight fluorescent pigments according to the invention the fluorescent dyestuffs are incorporated in the polyester resins by dissolving or dispersing them in a solution containing the mixture of the copolymers containing anhydride groups and the alcohol, whereupon the mixture is cured in the manner mentioned above. The fluorescent dyestuffs may, however, also already be present in a dissolved or dispersed form in the solution containing the copolymer that contains anhydride groups, or they are used in a form chemically bound to the alcohols.

The cured product thus obtained is then converted into a finely divided form by dry or wet grinding in a ball or bead mill. Grinding is expediently carried out in the presence of water. The particle size of the daylight fluorescent pigment, which may vary within wide limits, depends to a large extent on the desired field of application. Thus, the average particle size of the daylight fluorescent pigment generally ranges between about 5 and 30 microns, if it is to be used for preparing printing inks for silk screen printing or for preparing lacquers, and between about 0.1 and 5 microns, if printing inks are to be prepared.

The concentration of the dyestuff in the resin depends above all on the type of the resin, on the dyestuff used and on the desired application of the daylight pigment. The dyestuff concentration generally ranges between about 0.1 and 10% by weight. The daylight pigment preferably contains the dyestuff in a concentration which provides the best possible brilliancy, the tinctorial strength of the product dyed with this dyestuff being good.

The daylight fluorescent pigments produced with the use of the condensed resins of the invention may be employed for preparing fluorescent paints, for example, air-drying lacquers on the basis of alkyd resins or physically drying lacquers on the basis of acrylic resins, as well as for preparing fluorescent printing inks, such as inks for screen printing, intaglio printing, book printing and off-set-litho printing. Due to their high resistance to heat, they are especially suitable for fluorescent coloring of plastic material which are usually processed between 200° and 300° C., and enamels which are stoved above 150° C.

The following examples serve to illustrate the invention, the parts and percentages being by weight unless stated otherwise.

EXAMPLE 1

400 grams of ethyl-glycol acetate were heated to about 140° C. and a mixture of 240 g. of methyl-methacrylate, 160 g. of maleic acid anhydride, 4.8 of di-tert.-butyl peroxide and 9.6 g. of tert.-dodecyl-mercaptane was added in the course of 5 hours, and polymerization was then continued for another hour. The reaction mixture then reached a solids content of 60%. 100 parts of the acrylate resin solution thus obtained were mixed at 120° C. with 18.2 parts of trimethylol-propane and the mixture was cured at 150° C. under greatly reduced pressure for 17 hours.

The transparent brittle cured products could be ground to a fine powder. They became plasticized at 255° C., changed color above 300° C. and were insoluble in heptane, xylene, ethanol, acetone and acetate.

100 parts of the above acrylate resin solution, 18.2 parts of trimethylol-propane and 0.23 part of 10-methoxy-benzoxanthene-3,4-dicarboxylic acid hydrazide were mixed while stirring at 120° C. and cured at 150° C. under greatly reduced pressure over 17 hours. An intensely greenish yellow fluorescent product was obtained, which could be ground in a ball or vibration mill to a fine powder which became plasticized at 250° C. and was insoluble in heptane, ethanol, acetone and butyl acetate.

Instead of trimethylol-propane, 16.3 parts of trimethylolethane, 12.5 parts of glycerol or 18.5 parts of pentaerythritol can also be used.

EXAMPLE 2

A mixture of 160 g. of methyl-methacrylate, 120 g. of butylmethacrylate, 120 g. of maleic acid anhydride, 4.8 g. of di-tert.-butyl peroxide and 9.6 of tert.-dodecyl-mercaptane was added within 5 hours to 400 g. of ethyl-glycol acetate that had been heated to 140° C., and polymerization was continued for another hour at 140° C. The solids content of the reaction mixture then reached a value of 57%. 100 parts of this acrylate resin solution were mixed at 120° C. with 13.7 parts of trimethylol-propane and cured at 150° C. under greatly reduced pressure over 17 hours. The transparent brittle cured products obtained were ground to a fine powder. They became plasticized at 210° C., changed color at 290° C. and were insoluble in heptane, xylene, ethanol, acetone and butyl acetate.

When a mixture of 100 parts of the above acrylate resin solution, 13.7 parts of trimethylol-propane and 0.21 part of 10-methoxy-benzoxanthene-3,4-dicarboxylic acid hydrazide was cured at 150° C. under greatly reduced pressure over 17 hours, an intensely greenish yellow fluorescent product was obtained, which was ground in a ball mill to yield the daylight fluorescent pigment. It became plasticized at 210° C., changed at 295° C. to become dark brown and was insoluble in heptane, xylene, ethanol, acetone and butyl acetate.

Instead of 10-methoxy-benzoxanthene-3,4-dicarboxylic acid hydrazide, the following fluorescent dyestuffs can also be used (with mention of their fluorescent shades): Benzoxanthene-3,4-dicarboxylic acid imide (green), benzoxanthene-3,4-dicarboxylic acid -N-3'-sulfamoyl phenylimide (green), benzothioxanthene-3,4-dicarboxylic acid imide (green), benzothioxanthene-3,4-dicarboxylic acid stearylimide (greenish yellow), benzothioxanthene-3,4-dicarboxylic acid hydrazide (greenish yellow), 4-amino-1,8-naphthal-2',4'-dimethyl-phenylimide (green) or 7-oxo-14-thiadibenzo (b,d,e,f)-chrysene (orange-yellow).

4 parts of the daylight fluorescent pigment obtained as above were mixed for 5 minutes at 160° C. on a two-roller mixer with 96 parts of pulverized polyvinyl chloride containing 3% of an organic tin stabilizer and 1% of hydroxy-stearic acid. The resulting coat was stripped off and compression-molded for 5 minutes at 170° C. The compressed sheet obtained had an intense green yellow fluorescent shade.

EXAMPLE 3

A mixture of 160 g. of methyl-methacrylate, 120 g. of styrene, 120 g. of maleic acid anhydride, 4.8 g. of di-tert.-butyl peroxide and 9.6 g. of tert.-dodecyl-mercaptane was added within 5 hours to 400 g. of ethyl-glycol acetate that had been heated to 140° C., and polymerization was continued for another hour at 140° C. The solids content of the reaction mixture had then reached the value of 57.5%. 100 parts of this resin solution were mixed at 120° C. with 13.7 parts of trimethylol-propane and cured at 150° C. under greatly reduced pressure for 17 hours. The transparent brittle cured products thus obtained were ground to a fine powder. They became plasticized at 250° C., their color turned to dark brown above 290° C. and they were insoluble in heptane, xylene, ethanol, acetone and butyl acetate.

A mixture of 100 parts of the above resin solution, 13.7 parts of trimethylol-propane and 0.18 part of benzoxanthene-3,4-dicarboxylic acid hydroxy-ethyl imide was cured at 150° C. under greatly reduced pressure for 17 hours. An intensely greenish yellow fluorescent cured product was obtained, which was finely ground in a ball mill to yield the daylight fluorescent pigment. It became plasticized at 245° C. and was insoluble in heptane, xylene, ethanol, acetone and butyl acetate.

For the production of an enamel 20 parts of the daylight fluorescent pigment obtained according to the above example were ground together with 45 parts of xylene, 25 parts of a 60% solution of a non drying alkyd resin having a low oil content and made from 37% of oil (triglyceride) and 40% of phthalic acid anhydride in xylene, and 10 parts of a 50% solution of non plasticized melamine resin, in alcohols and aromatic hydrocarbons in the presence of quartzite pearls (of a diameter of 2 to 3 mm.) in a 200-ml. plastic beaker for 20 minutes on a paint shaker. The lacquer obtained was sprayed on white coated test plates (30 x 30 cm.) and stoved for 20 minutes at 160° C. It had an intense greenish yellow fluorescence.

EXAMPLE 4

400 g. of ethyl-glycol acetate were heated to 70° C. and a mixture of 120 g. of methyl-methacrylate, 120 g. of vinyl acetate, 160 g. of maleic acid anhydride, 4.8 g. of azo-isobutyronitrile and 9.6 g. of tert.-dodecyl-mercaptane was added over 5 hours. The reaction mixture was polymerized for another 2 hours, whereupon the solution had a solids content of 56%. 100 parts of this resin solution were mixed at 120° C. with 18.2 parts of trimethylol-propane and then cured for 15 hours at 150° C. under greatly reduced pressure. Transparent brittle cured products were obtained, which could finely be ground in a ball mill. They became plasticized at 210° C. and changed color at 230° C. They were insoluble in heptane, xylene and ethanol.

A daylight fluorescent pigment was prepared with the above product in the same manner as disclosed in Example 1.

We claim:

1. A daylight fluorescent pigment consisting essentially of: (1) a copolymerizate of an unsaturated carboxylic acid anhydride selected from the group consisting of maleic acid anhydride, tetrahydrophthalic acid anhydride and endocis-bicyclo-(2,2,1)-5-heptene - 2,3 - dicarboxylic acid anhydride, and a vinyl compound capable of being copolymerized selected from the group consisting of acrylic and methacrylic acid alkyl and aryl esters, styrene, α-methyl-styrene, acrylonitrile, vinyl chloride, methylvinyl ether, ethyl-vinyl ester, vinyl acetate, vinyl propionate and vinyl butyrate, said copolymerizate being cross linked with a bi- or polyfunctional alcohol or mixture thereof selected from the group consisting of ethylene glycol, neopentyl glycol, trimethylol-ethane and pentaerythritol; and (2) a fluorescent dyestuff of the benzoxanthene or benzothioxanthene series.

2. A daylight fluorescent pigment as recited in claim 1 wherein said copolymerizate includes from 10 to 50% by weight of monomer containing anhydride groups and has a molecular weight of from 3000 to 50,000.

3. A daylight fluorescent pigment as recited in claim 1 wherein the quantity of alcohol used to cross link said copolymerizate is from one-half to one-and-one half equivalents based on the number of equivalents of anhydride groups in the copolymerizate.

References Cited

UNITED STATES PATENTS

| | | | |
|---|---|---|---|
| 2,280,242 | 4/1942 | Kropa et al. | 260—78.5 U |
| 2,519,764 | 8/1950 | Jacobson | 260—78.5 U |
| 2,526,434 | 10/1950 | Tawney | 260—78.5 U |
| 2,557,136 | 6/1951 | Nichols | 260—78.5 U |
| 2,606,172 | 8/1952 | Tawney | 260—78.5 U |
| 2,612,492 | 9/1952 | Tawney | 260—78.5 U |
| 2,677,671 | 5/1954 | Yuska et al. | 260—78.5 U |
| 2,828,278 | 3/1958 | Kosmin | 260—75 TN |
| 2,899,402 | 8/1959 | Squire | 260—78.5 U |
| 2,938,873 | 5/1960 | Kazenas | 252—301.2 R |
| 3,257,360 | 6/1966 | Slocombe | 260—78.5 E |
| 3,412,036 | 11/1968 | McIntosh | 252—301.2 R |

DANIEL E. WYMAN, Primary Examiner

A. P. DEMERS, Assistant Examiner

U.S. Cl. X.R.

106—288 Q; 260—40 R, 41 C, 78.5 E, 78.5 UA